(12) United States Patent
Hatano

(10) Patent No.: US 7,139,579 B2
(45) Date of Patent: Nov. 21, 2006

(54) RELAY AND COMMUNICATION SYSTEM

(75) Inventor: Ken Hatano, Ome (JP)

(73) Assignee: Kabushika Kaisha Toshiba, Tokyo (JP)

( * ) Notice: Subject to any disclaimer, the term of this patent is extended or adjusted under 35 U.S.C. 154(b) by 652 days.

(21) Appl. No.: 10/462,597

(22) Filed: Jun. 17, 2003

(65) Prior Publication Data
US 2004/0087268 A1    May 6, 2004

(30) Foreign Application Priority Data
Oct. 30, 2002    (JP)    ............................. 2002-315911

(51) Int. Cl.
*H04Q 7/20*    (2006.01)
(52) U.S. Cl. .................. 455/453; 455/67.16; 455/423; 455/452.1
(58) Field of Classification Search ................ 455/453, 455/445, 423, 452.1, 452.2, 9, 11.1, 18, 509, 455/510, 512, 63.3, 67.11, 67.16; 370/235, 370/230, 352, 401, 468
See application file for complete search history.

(56) References Cited

U.S. PATENT DOCUMENTS

| | | | |
|---|---|---|---|
| 5,414,697 A * | 5/1995 | Osaki .......................... | 370/236 |
| 5,666,348 A | 9/1997 | Thornberg et al. | |
| 6,456,858 B1 | 9/2002 | Streter | |
| 2002/0141382 A1 * | 10/2002 | Winther et al. ............. | 370/352 |
| 2002/0186657 A1 * | 12/2002 | Jain et al. ................... | 370/235 |
| 2004/0170154 A1 * | 9/2004 | Carter et al. ................ | 370/338 |

FOREIGN PATENT DOCUMENTS

| | | |
|---|---|---|
| AU | 740 815 B2 | 11/2000 |
| CN | 1244985 A | 2/2000 |
| EP | 1 058 473 A1 | 6/2000 |
| JP | 11-55286 | 2/1999 |
| JP | 2001-78260 | 3/2001 |
| JP | 2001-326658 | 11/2001 |
| WO | WO 01/35578 A1 | 5/2001 |

OTHER PUBLICATIONS

Notification of Reasons for Rejection, dated Jul. 19, 2005, issued by Japanese Patent Office in Japanese application No. 2002-315911 and English translation thereof.
Notification of the First Office Action issued by the Chinese Patent Office for Chinese Patent Application No. 03148350.X on Sep. 9, 2005, and English-language translation thereof.
European Search Report (EP 0 3 01 2836) dated Jun. 6, 2006.

* cited by examiner

*Primary Examiner*—Edward F. Urban
*Assistant Examiner*—John J. Lee
(74) *Attorney, Agent, or Firm*—Finnegan, Henderson, Farabow, Garrett & Dunner, L.L.P.

(57) ABSTRACT

This invention relates to a wireless LAN access point including a communication unit capable of communication by the first wireless communication method, a unit which detects that the traffic density in the communication band used by the first wireless communication method exceeds a predetermined traffic density, and a unit which limits the traffic density in the communication band of the first wireless communication method by a wireless LAN client when the traffic density is detected to exceed the predetermined traffic density.

15 Claims, 7 Drawing Sheets

RELAY AND COMMUNICATION SYSTEM

CROSS-REFERENCE TO RELATED APPLICATIONS

This application is based upon and claims the benefit of priority from the prior Japanese Patent Application No. 2002-315911, filed Oct. 30, 2002, the entire contents of which are incorporated herein by reference.

BACKGROUND OF THE INVENTION

1. Field of the Invention

The present invention relates to a relay and communication system and, more particularly, to a relay and communication system capable of switching between two wireless communication methods.

2. Description of the Related Art

A technique of increasing the throughput has conventionally been developed (Jpn. Pat. Appln. KOKAI Publication No. 11-55286). According to this technique, the number of clients connectable to a wireless LAN access point is defined. If a wireless LAN access point is accessed by clients exceeding this determined number, connection requests from the wireless LAN access point are denied.

In this technique, an access is limited by only the number of clients accessible to a wireless LAN access point. An access is limited when clients each connected to an access point produce relatively light traffic, like a client which merely browses the Web or a client which uses only mail.

Such clients produce only light traffic, and even if more than a predetermined number of such clients are connected, the throughput does not decrease. However, accesses are limited even with a margin for the communication band, failing to effectively use the communication band.

BRIEF SUMMARY OF THE INVENTION

According to an embodiment of the present invention, there is provided a relay comprising a communication unit capable of communication by a first communication method, means for detecting that a traffic density in a communication band used by the first communication method exceeds a predetermined traffic density, and means for limiting the traffic density in the communication band of the first communication method by a client device when the traffic density is detected to exceed the predetermined traffic density.

According to the embodiment of the present invention, there is also provided a communication control method in a wireless relay capable of communication by a first wireless communication method, comprising detecting that a traffic density in a communication band used by the first wireless communication method exceeds a predetermined traffic density, and limiting the traffic density in the communication band of the first wireless communication method by a wireless terminal when the traffic density is detected to exceed the predetermined traffic density.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

A wireless LAN system according to the first embodiment of the present invention will be described below with reference to several views of the accompanying drawing.

Figure 1:
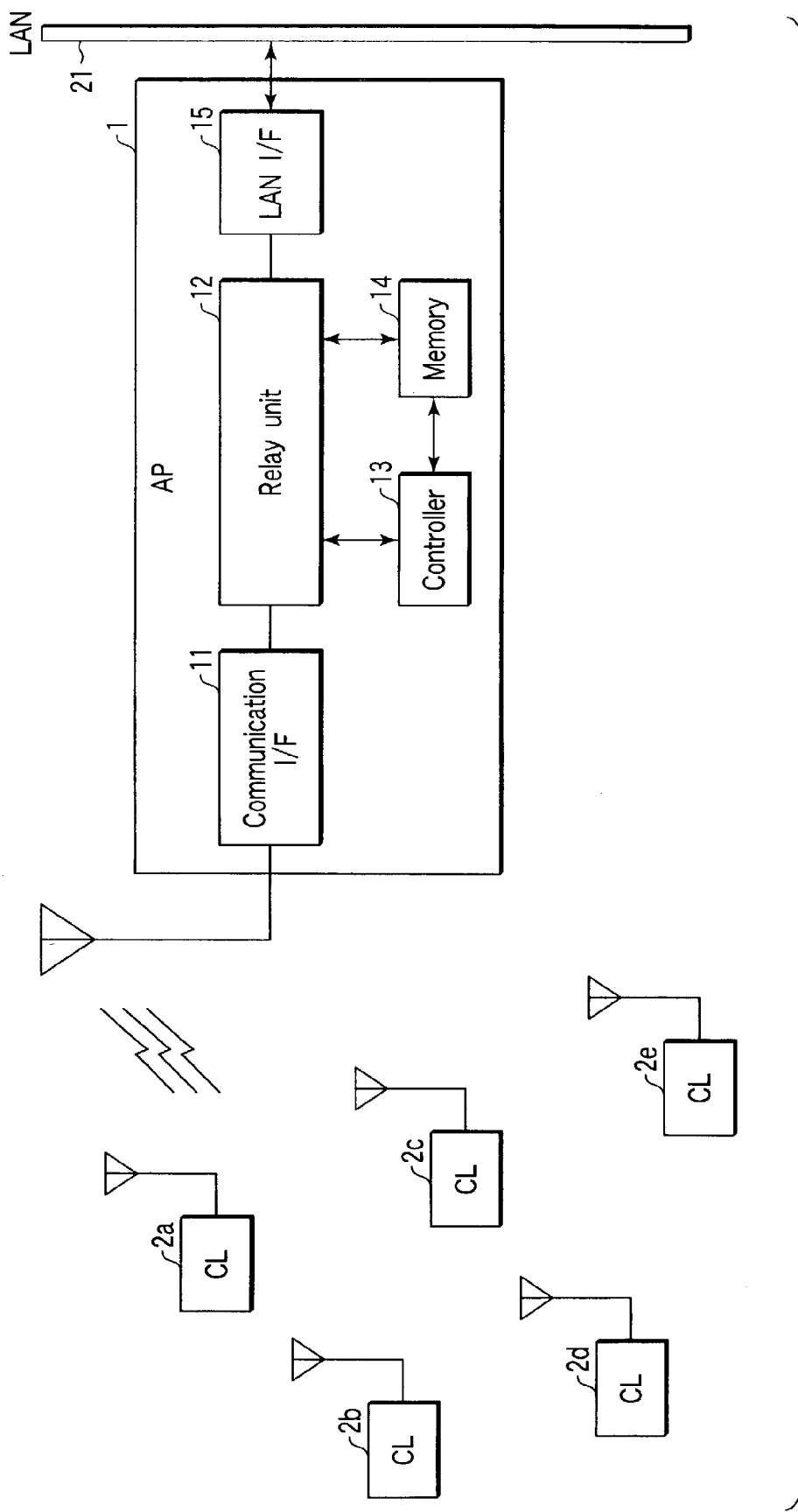
FIG. 1 is a block diagram showing a wireless LAN system according to the first embodiment of the present invention.

FIG. 1 is a block diagram showing the wireless LAN system according to the first embodiment of the present invention.

As shown in FIG. 1, the wireless LAN system according to the first embodiment of the present invention comprises an access point 1, and clients 2a to 2e which wirelessly access the access point.

The access point 1 comprises a communication I/F 11, relay unit 12, controller 13, memory 14, and LAN I/F 15.

The communication I/F 11 is an interface for communicating with the clients 2a to 2e.

The relay unit 12 performs repeating processing between a wireless LAN comprised of the clients 2a and 2e, and a wired LAN 21, and routing processing in the wireless LAN.

The controller 13 controls the overall wireless LAN access point 1, and executes the operation of the wireless LAN system according to the first embodiment of the present invention. This processing will be described later.

The memory 14 is used for processing by the relay unit 12 and controller 13, and stores a table adopted in the first embodiment of the present invention.

The LAN I/F 15 is an interface for communication between the access point 1 and the wired LAN 21.

Figure 2:
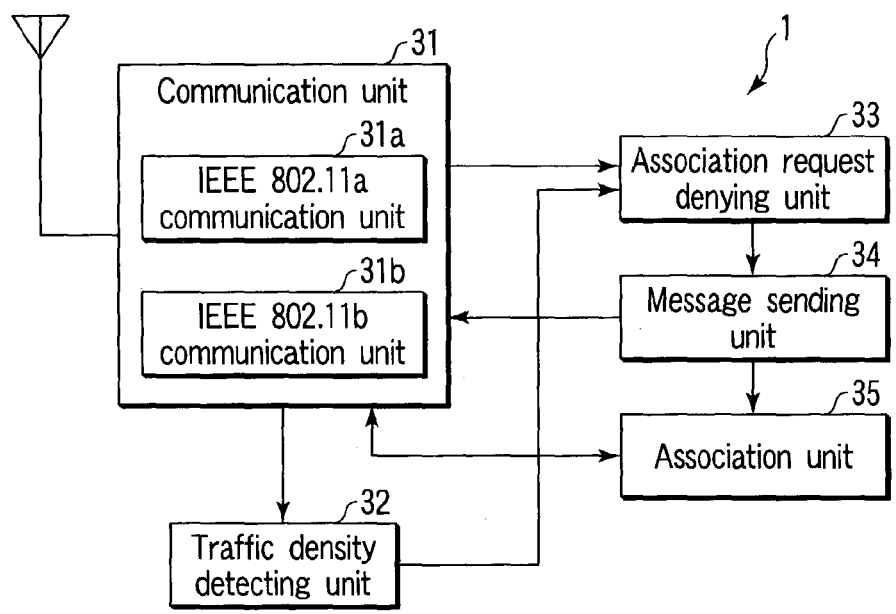
FIG. 2 is a functional block diagram showing an access point 1 according to the first embodiment of the present invention.

FIG. 2 is a functional block diagram showing the access point 1 according to the first embodiment of the present invention.

As shown in FIG. 2, the access point 1 according to the first embodiment of the present invention comprises a communication unit 31, traffic density detecting unit 32, association request denying unit 33, message sending unit 34, and association unit 35.

The communication unit 31 performs wireless communication between the access point and a client. The communication unit 31 comprises an IEEE 802.11a communication unit 31a and IEEE 802.11b communication unit 31b according to two communication methods.

The IEEE 802.11a communication unit 31a performs communication complying with the IEEE 802.11a communication method.

The IEEE 802.11b communication unit 31b performs communication complying with the IEEE 802.11b communication method.

The traffic density detecting unit 32 detects traffic densities produced by the IEEE 802.11a communication unit 31a and IEEE 802.11b communication unit 31b. More specifically, the traffic density detecting unit 32 detects that the communication band use amount of the IEEE 802.11a communication unit 31a exceeds a predetermined use amount. Also, the traffic density detecting unit 32 detects that the communication band use amount of the IEEE 802.11b communication unit 31b exceeds a predetermined use amount. The predetermined use amount is arbitrarily set to, e.g., a data rate of 20 MB/min.

The association request denying unit 33 denies an association request from a client when the traffic density detecting unit 32 detects that the traffic density exceeds a predetermined use amount.

More specifically, when the traffic density detecting unit 32 detects that the communication band use amount of the IEEE 802.11a communication unit 31a exceeds a predetermined use amount, the association request denying unit 33 denies an association request from a client in the IEEE 802.11a communication band. When the traffic density detecting unit 32 detects that the communication band use amount of the IEEE 802.11b communication unit 31b exceeds a predetermined use amount, the association request denying unit 33 denies an association request from a client in the IEEE 802.11b communication band.

The message sending unit 34 sends a message that communication should be done by another communication method when the association request denying unit 33 denies an association. More specifically, when an association request is denied in the IEEE 802.11a communication band, the message sending unit 34 sends a message in the IEEE 802.11a communication band to a client which has issued the association request. When an association request is denied in the IEEE 802.11b communication band, the message sending unit 34 sends a message in the IEEE 802.11b communication band to a client which has issued the association request.

In response to a message sent by the message sending unit 34, the association unit 35 executes an association upon reception of an association request which is transmitted by a client according to a communication method different from the communication method of the first association request.

Figure 4:
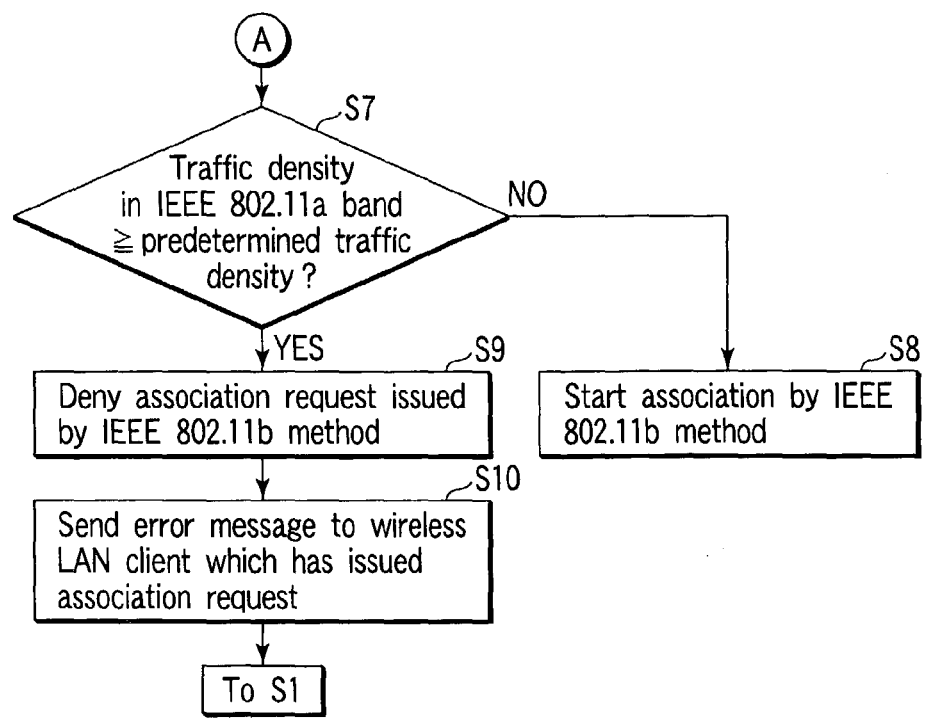
FIG. 4 is a flow chart for explaining the operation of the wireless LAN access point according to the first embodiment of the present invention.
Figure 3:
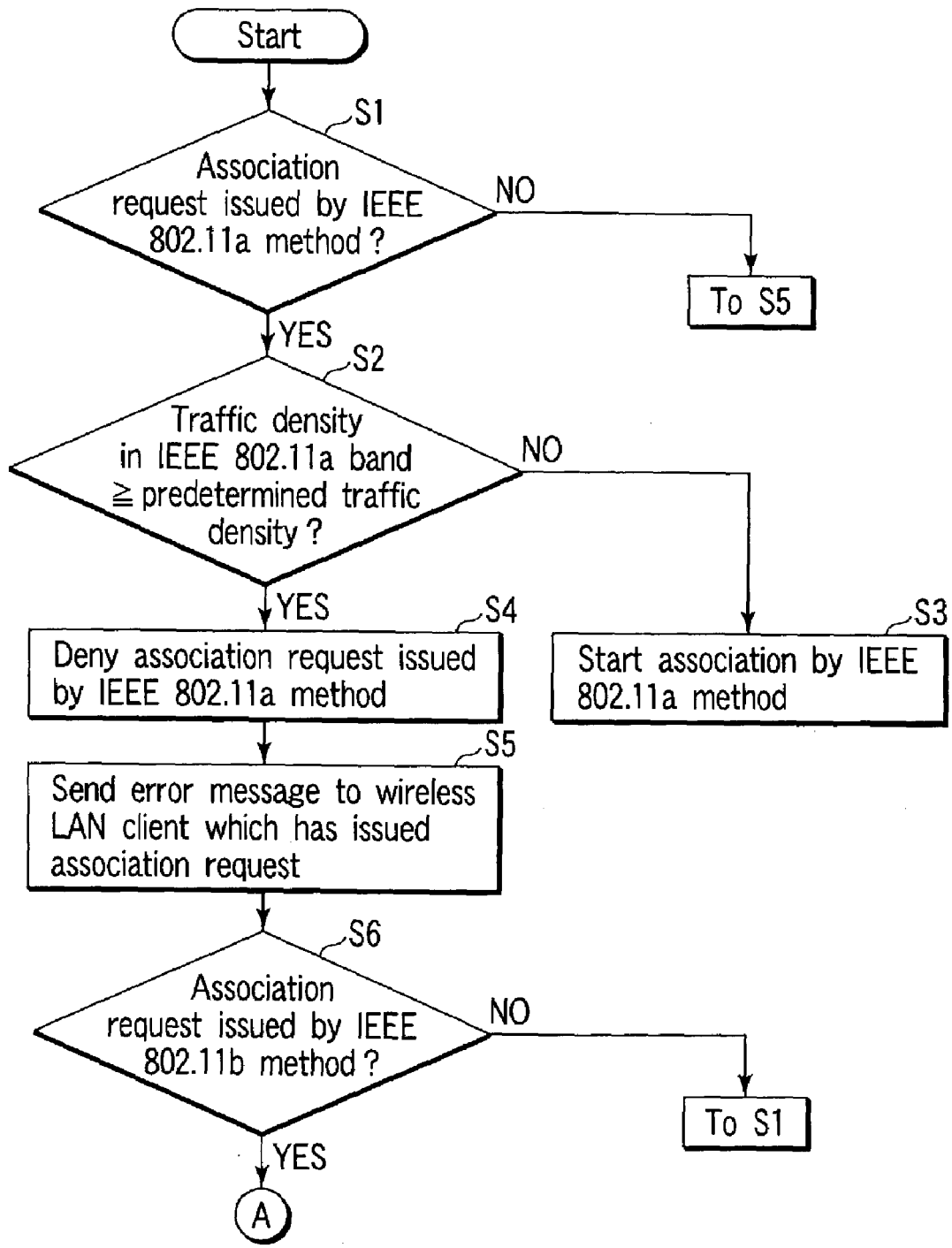
FIG. 3 is a flow chart for explaining the operation of the wireless LAN access point according to the first embodiment of the present invention.

The operation of the wireless LAN access point according to the first embodiment of the present invention will be explained with reference to the flow charts of FIGS. 3 and 4.

Whether a client has issued an association request by the IEEE 802.11a method is decided (SI). If NO in Si, the flow shifts to processing in S5 to be described later.

If YES in SI, whether the traffic density in the IEEE 802.11a band is equal to or larger than a predetermined traffic density is decided (S2).

If NO in S2, an association starts by the IEEE 802.11a method (S3). If YES in S2, it is determined that the traffic density in the IEEE 802.11a band is equal to or larger than a predetermined traffic density, i.e., heavy, and the association request issued by the IEEE 802.11a method is denied (S4).

An error message that communication should be done by another communication method is sent in the IEEE 802.11a band to the wireless LAN client which has issued the association request (S5). The contents of the error message prompt reconnection in the IEEE 802.11b communication band because the IEEE 802.11a communication band is crowded.

Whether an association request has been issued by the IEEE 802.11b method in response to the error message is decided (S6). If YES in S6, whether the traffic density in the IEEE 802.11 band is equal to or larger than a predetermined traffic density is decided (S7). If YES in S7, the association request issued by the IEEE 802.11b method is denied (S9). If NO in S6, the flow returns to processing in S1.

After the association request is denied in S9, an error message is sent from the wireless LAN access point to the wireless LAN client which has issued the association request (S10). The flow then returns to processing in S1.

This operation is performed at the wireless LAN access point. When the traffic density exceeds a predetermined traffic density in a given band, an association request in this band is denied, and an association is done in another band. In this manner, the communication band can be controlled.

Figure 5:
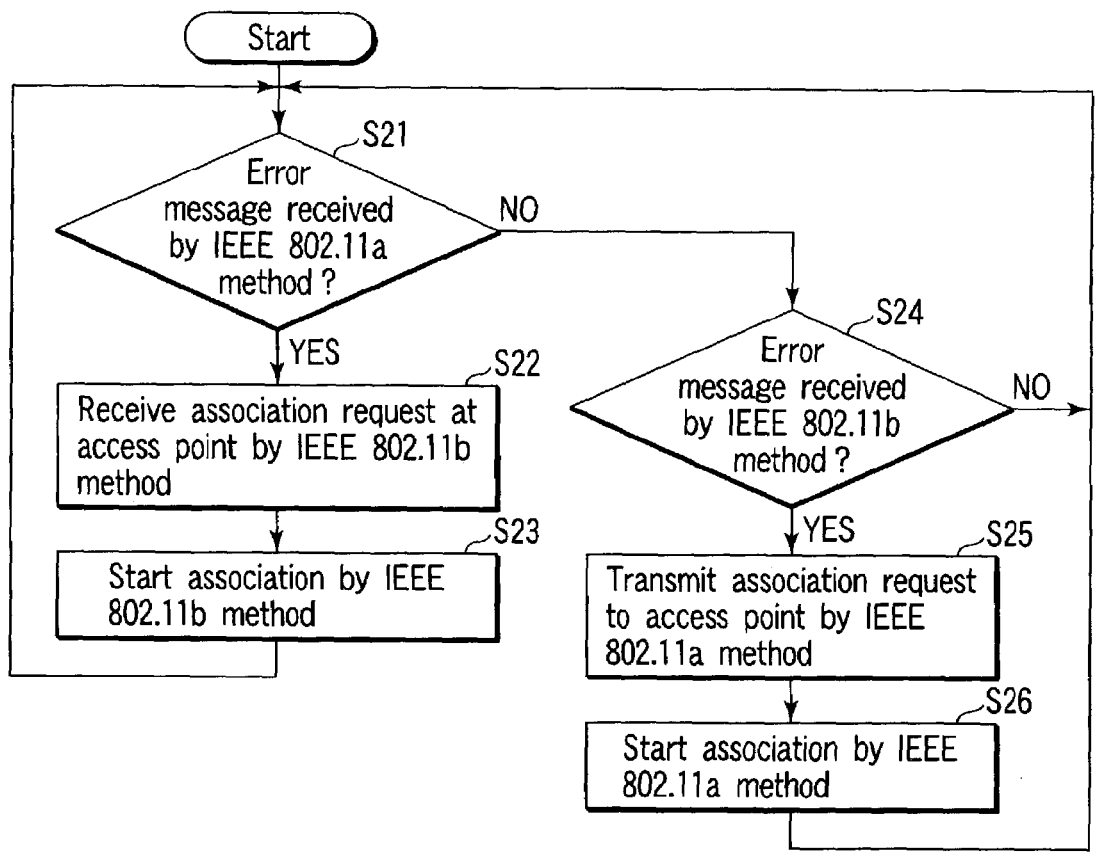
FIG. 5 is a flow chart for explaining the operation of a wireless LAN client.

The operation of the wireless LAN client will be explained with reference to the flow chart of FIG. 5.

Whether an error message has been received by the IEEE 802.11a method from the wireless LAN access point is decided (S21). If YES in S21, IEEE 802.11a wireless connection is released, and an association request is transmitted to the wireless LAN access point by the IEEE 802.11b method (S22). Thereafter, an association starts by the IEEE 802.11b method (S23).

If NO in S21, whether an error message has been received by the IEEE 802.11b method from the wireless LAN access point is decided (S24).

If YES in S24, IEEE 802.11b wireless connection is released, and an association request is transmitted to the wireless LAN access point by the IEEE 802.11a method (S25).

After that, an association starts by the IEEE 802.11a method (S26), and the flow returns to processing in S21. If NO in S24, the flow shifts to processing in S21.

The wireless LAN system according to the first embodiment of the present invention can control the wireless communication band by performing an association by another communication method when a wireless LAN client receives an error message from a wireless LAN access point.

Second Embodiment

A wireless LAN system according to the second embodiment of the present invention will be described below. The hardware arrangement of the wireless LAN system according to the second embodiment of the present invention is the same as that shown in FIG. 1.

In the first embodiment, when the traffic density is equal to or larger than a predetermined traffic density, an association from a client is denied, and a message for an association by another communication method is sent to the client.

In the wireless LAN system according to the second embodiment of the present invention, a client which has already achieved an association is disassociated from the access point side.

Figure 6:
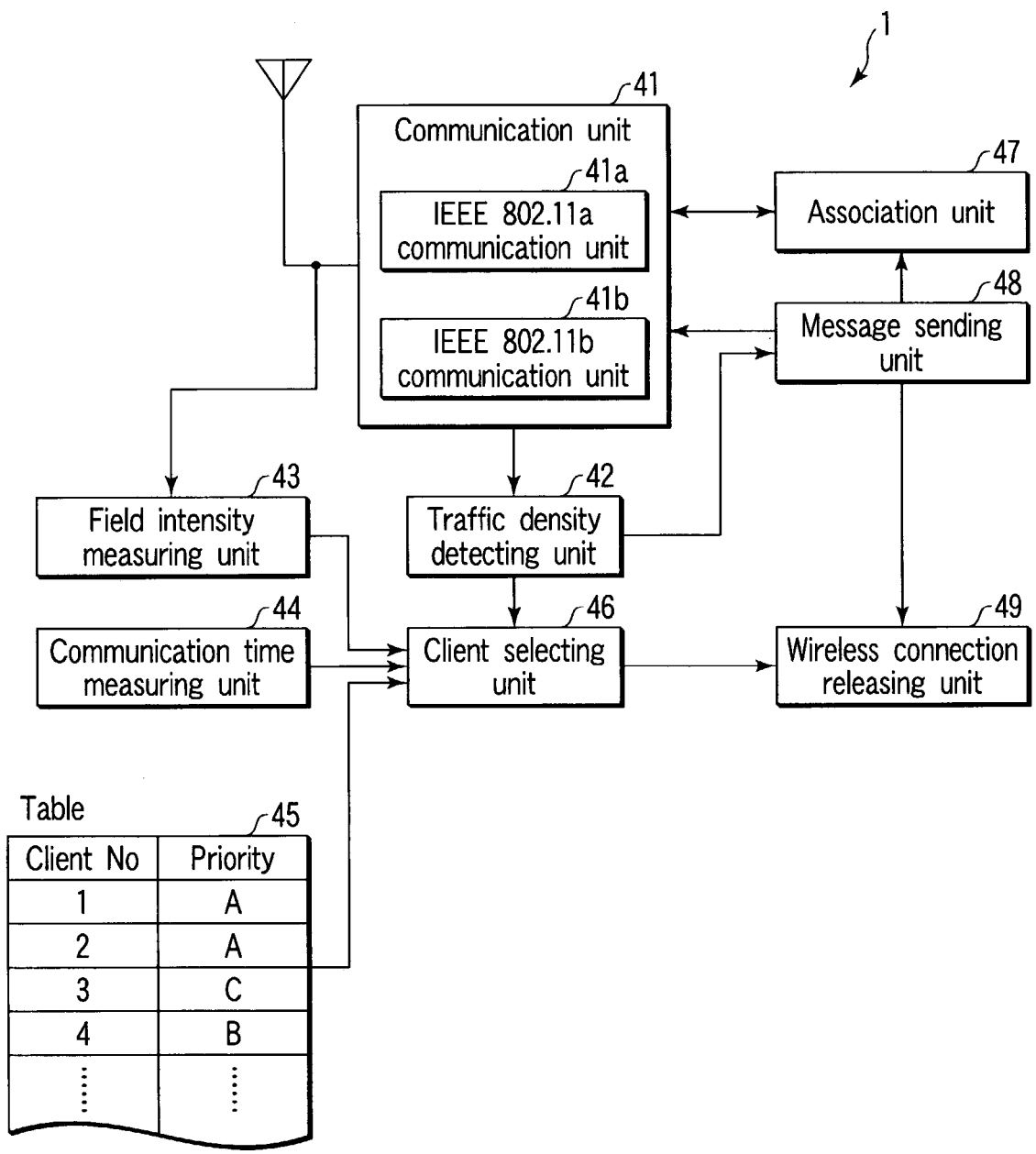
FIG. 6 is a functional block diagram showing an access point in a wireless LAN system according to the second embodiment of the present invention.

FIG. 6 is a functional block diagram showing an access point in the wireless LAN system according to the second embodiment of the present invention.

As shown in FIG. 6, an access point 1 according to the second embodiment of the present invention comprises a communication unit 41, traffic density detecting unit 42, field intensity measuring unit 43, communication time measuring unit 44, table 45, client selecting unit 46, association unit 47, message sending unit 48, and wireless connection releasing unit 49.

The communication unit 41 performs wireless communication between the access point and a client. The communication unit 41 comprises an IEEE 802.11a communication unit 41a and IEEE 802.11b communication unit 41b according to two communication methods.

The IEEE 802.11a communication unit 41a performs communication complying with the IEEE 802.11a communication method.

The IEEE 802.11b communication unit 41b performs communication complying with the IEEE 802.11b communication method.

The traffic density detecting unit 42 detects traffic densities produced by the IEEE 802.11a communication unit 41a and IEEE 802.11b communication unit 41b. More specifically, the traffic density detecting unit 42 detects that the communication band use amount of the IEEE 802.11a communication unit 41a exceeds a predetermined use amount. Also, the traffic density detecting unit 42 detects that the communication band use amount of the IEEE 802.11b communication unit 41b exceeds a predetermined use amount.

The field intensity measuring unit 43 measures the field intensity of radio waves transmitted by a client.

The communication time measuring unit 44 measures communication times with a plurality of associated wireless LAN clients.

The table 45 stores the priority levels of a plurality of associated wireless LAN clients. For example, as shown in FIG. 6, client numbers "1" and "2" are set to priority "AA"; client number "3", to priority "C"; and client number "4", to priority "B".

FIG. 6 shows the three, field intensity measuring unit 43, communication time measuring unit 44, and table 45. However, the system suffices to comprise a function corresponding to a client selecting method in the client selecting unit 46.

That is, the system suffices to comprise only the field intensity measuring unit 43 when the client selecting unit 46 selects a client on the basis of the field intensity, or the communication time measuring unit 44 when the client selecting unit 46 selects a client on the basis of the communication time.

The client selecting unit 46 selects a wireless LAN client to be disassociated from a plurality of associated wireless LAN clients in accordance with a predetermined selecting method.

For example, to select a wireless LAN client to be disassociated on the basis of the field intensity, the client selecting unit 46 selects a wireless LAN client having the lowest field intensity among the field intensities of a plurality of wireless LAN clients that are measured by the field intensity measuring unit 43.

To select a wireless LAN client to be disassociated on the basis of the communication time, the client selecting unit 46 selects a wireless LAN client having the shortest communication time among the communication times of a plurality of wireless LAN clients that are measured by the communication time measuring unit 44.

To select a wireless LAN client to be disassociated on the basis of priority, the client selecting unit 46 selects a wireless LAN client having the lowest priority by referring to the table 45 in which the client number and priority are associated.

When the client selecting unit 46 selects a client, the message sending unit 48 sends by the current communication method a message which prompts reconnection. The message which prompts reconnection can contain information representing a communication method for reconnection, and information representing an access point to be reconnected.

Figure 7:
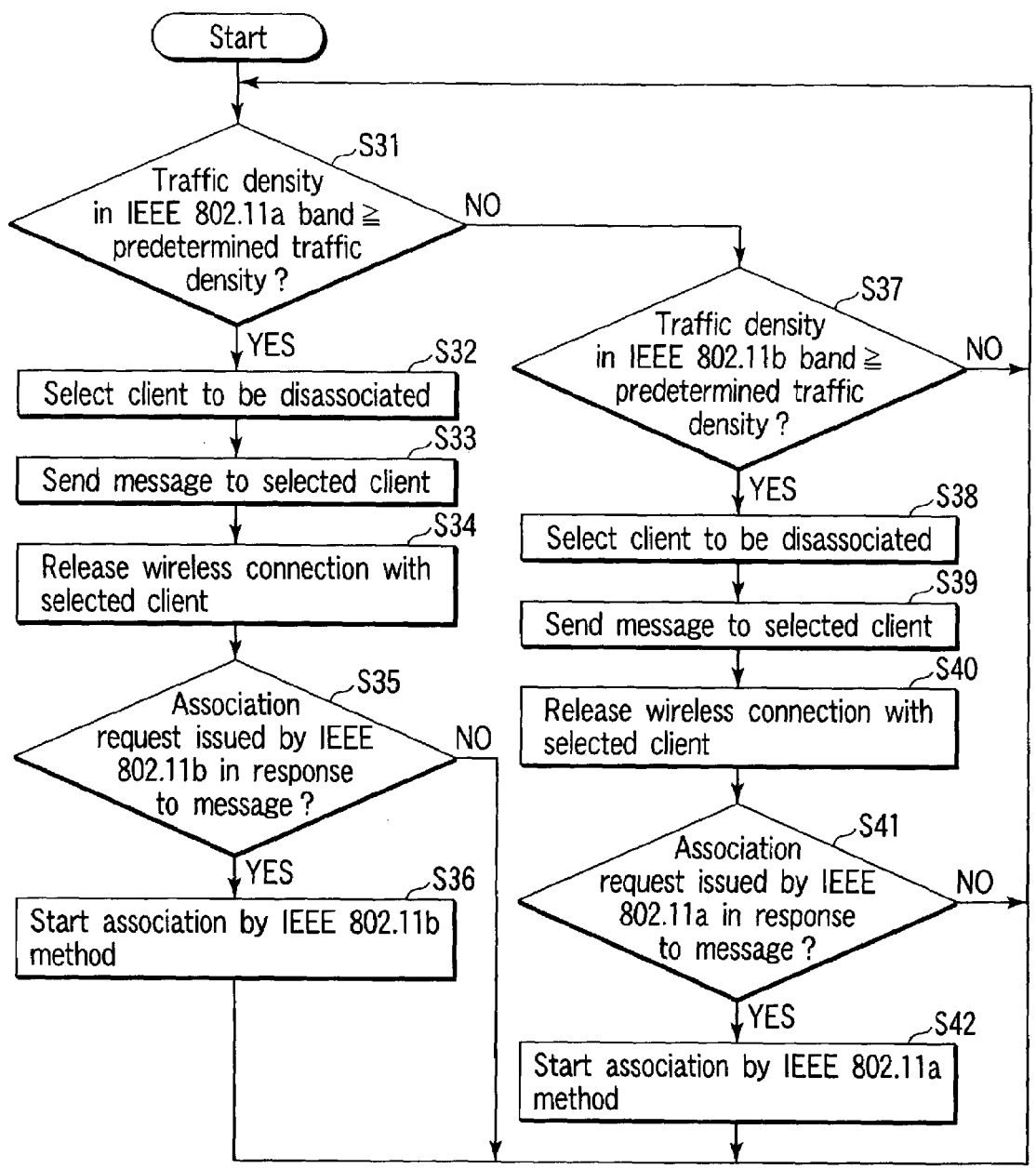
FIG. 7 is a flow chart for explaining the operation of the wireless LAN system according to the second embodiment of the present invention.

After the message sending unit 48 sends a message, the wireless connection releasing unit 49 cuts off communication with a client selected by the client selecting unit 46. The operation of the wireless LAN system according to the second embodiment of the present invention will be explained with reference to the flow chart of FIG. 7.

Whether the traffic density in the IEEE 802.11a band is equal to or larger than a predetermined traffic density is decided (S31). If YES in S31, a client to be disassociated is selected (S32).

The client selecting method complies with any one of the following rules.

1. The field intensities of radio waves transmitted by a plurality of associated wireless LAN clients are measured. A wireless LAN client which has transmitted radio waves at the lowest field intensity among the measured field intensities is selected.

2. Communication times with a plurality of associated wireless LAN clients are measured. A wireless LAN client having the shortest communication time among the measured communication times is selected.

3. A table which stores the priority levels of a plurality of associated wireless LAN clients is referred to, and a wireless LAN client having the lowest priority is selected.

After that, an error message is sent to the selected client (S33). The contents of the error message prompt reconnection in the IEEE 802.11b communication band because the IEEE 802.11a communication band is crowded.

Wireless communication with the selected client is cut off (S34). Whether an association request has been issued by the IEEE 802.11b communication method in response to the error message is decided (S35).

If NO in S35, the flow returns to processing in S31. If YES in S35, an association with the client starts by the IEEE 802.11b communication method (S36), and the flow returns to step S31.

If NO in S31, whether the traffic density in the IEEE 802.11b band is equal to or larger than a predetermined traffic density is decided (S37). If YES in S37, a client to be disassociated is selected (S38). This client selecting method has been explained in S32.

An error message is sent to the selected client (S39). The contents of the error message prompt reconnection in the IEEE 802.11a communication band because the IEEE 802.11b communication band is crowded.

Wireless communication with the selected client is cut off (S40). Whether an association request has been issued by the IEEE 802.11a communication method in response to the error message is decided (S41).

If NO in S41, the flow returns to processing in S31. If YES in S41, an association with the client starts by the IEEE 802.11a communication method (S42), and the flow returns to step S31.

In the wireless LAN system according to the second embodiment of the present invention, when a given communication band is crowded, a message which prompts reconnection in another communication band is sent from an access point to a client, releasing connection with the associated client. The wireless LAN system can effectively utilize the communication band.

In the above-described embodiments, the access point decides a communication status, and the topology is changed by an action of the access point. Alternatively, the client may grasp the status and change the topology.

In wireless LAN communication, an access point operates not as a switching hub (which sends packets to only a port corresponding to an MAC address), but as a bridge or dumb hub (which sends all packets by broadcasting). Packets received by an access point and packets received by a client are the same.

However, this does not apply when the hidden station problem occurs. Hence, the client side can satisfactorily decide the traffic density, and preferably performs settings in accordance with its purpose.

For example, for a user who wants to only read mail but use IEEE 802.11a for printing or transfer of a large-capacity file, an IEEE 802.11b path may be decided to be more preferable than a crowded IEEE 802.11a path.

To the contrary, a client which transfers moving pictures that become useless without any IEEE 802.11a band is set not to shift to IEEE 802.11b. In this case, the client decides the traffic density, disassociates connection with IEEE 802.11a, and shifts to IEEE 802.11b.

Figure 8:
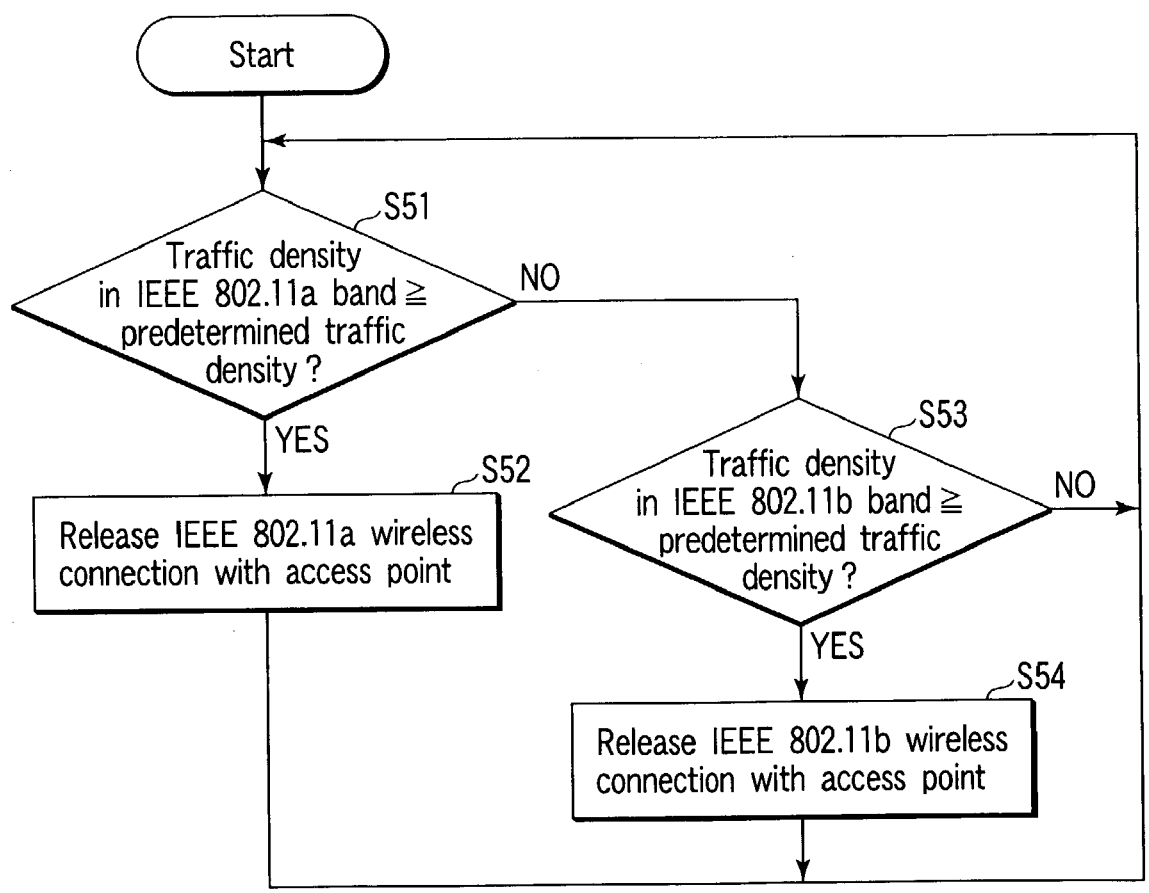
FIG. 8 is a flow chart showing the operation of a client in the wireless LAN system according to the present invention.

FIG. 8 is a flow chart for explaining an operation of deciding the traffic density by a client and releasing wireless connection.

As shown in FIG. 8, whether the traffic density in the IEEE 802.11a band is a predetermined traffic density is decided (S51). If YES in S51, IEEE 802.11a wireless connection with an access point is released (S52), and the flow returns to processing in S51.

If NO in S51, whether the traffic density in the IEEE 802.11b band is equal to or larger than a predetermined traffic density is decided (S53).

If NO in S53, the flow returns to processing in S51. If YES in S53, IEEE 802.11b wireless connection with an access point is released (S54), and the flow returns to processing in S51.

In the above-described embodiments, two communication methods are switched on the basis of the traffic density in the wireless LAN access point and client. The number of communication methods is not limited to two, that is, three or more communication methods may be adopted. For three or more communication methods, a message which prompts reconnection by a communication method using the least crowded band may be inserted in an error message. With this setting, the client can access an access point by the optimal communication method.

In the above-described embodiments, one access point performs communication by two communication methods. The access point may have only a function of performing communication by one communication method. In this case, when the traffic density exceeds a predetermined traffic density, the access point sends to a client an error message that reconnection is done by another communication method. The client which has received the error message associates with another access point by the reconnection communication method.

The present invention is not limited to the above-described embodiments, and can be variously modified without departing from the spirit and scope of the invention in practical use. The respective embodiments can be combined as properly as possible. In this case, the effects of the combination can be obtained. The embodiments include inventions on various stages, and various inventions can be extracted by an appropriate combination of building components disclosed. For example, when an invention is extracted by omitting several building components from all those described in the embodiments, the omission is properly compensated for by a well-known technique in practicing the extracted invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A relay comprising:
   a communication unit capable of communication by a first communication method;
   means for detecting that a traffic density in a communication band used by the first communication method exceeds a predetermined traffic density;
   means for limiting the traffic density in the communication band of the first communication method by a client device when the traffic density is detected to exceed the predetermined traffic density;
   means for sending an error message to the client device by using the first communication method when the association request is denied; and
   means for receiving an association request corresponding to the error message from the client device by using the second communication method, and associating with the client device by the second communication method,
   wherein the limiting means denies an association request using the first communication method from the client device when the traffic density is detected to exceed the predetermined traffic density.

2. A relay according to claim 1, wherein the communication unit performs communication by a second communication method using a communication band different from the communication band of the first communication method.

3. A relay according to claim 2, wherein the first communication method includes a first wireless communication method using the first communication band, and the second communication method includes a second wireless communication method using the second communication band.

4. A relay according to claim 3, wherein the limiting means comprises
   means for selecting a client device to be disassociated from a plurality of associated client devices when the traffic density is detected to exceed the predetermined traffic density, and
   means for releasing wireless connection with the selected client device.

5. A relay according to claim 4, wherein the selection means includes
   means for measuring field intensities of radio waves transmitted by the plurality of associated client devices, and
   means for selecting a client device which transmits radio waves at the lowest field intensity among the measured field intensities.

6. A relay according to claim 4, wherein the selection means includes
   means for measuring communication times with the plurality of associated client devices, and means for selecting a client device having the shortest communication time among the measured communication times.

7. A relay according to claim 4, which further comprises a table that stores priority levels of the plurality of associated client devices, and in which the selection means selects a client device having the lowest priority by referring to the table.

8. A wireless communication system comprising a wireless terminal and a wireless relay which perform communication by a first wireless communication method and a second wireless communication method different from the first wireless communication method,
   the wireless relay comprising
      means for detecting that a traffic density in a communication band used by the first wireless communication method exceeds a predetermined traffic density,
      means for denying an association request from the wireless terminal using the first wireless communication method when the traffic density is detected to exceed the predetermined traffic density, and
      means for transmitting an error message to the wireless terminal by using the first wireless communication method when the association request is denied,
   the wireless terminal comprising means for transmitting an association request to an access point by using the second wireless communication method in response to the error message, and
   the wireless relay comprising means for receiving the association request corresponding to the error message from the wireless terminal, and associating with the wireless terminal by the second wireless communication method.

9. A wireless communication system comprising a wireless terminal and a wireless relay which perform communication by a first wireless communication method and a second wireless communication method different from the first wireless communication method,
   the wireless relay comprising
      means for detecting that a traffic density in a communication band used by the first wireless communication method exceeds a predetermined traffic density,
      means for selecting a wireless terminal to be disassociated from a plurality of associated wireless terminals when the traffic density is detected to exceed the predetermined traffic density,
      means for releasing wireless connection with the selected wireless terminal, and
      means for transmitting an error message which prompts reconnection to the selected wireless terminal,
   the wireless terminal comprising means for transmitting an association request to an access point by using the second wireless communication method in response to the error message, and
   the wireless relay comprising means for receiving the association request corresponding to the error message from the wireless terminal, and associating with the wireless terminal by the second wireless communication method.

10. A communication control method in a wireless relay capable of communication by a first wireless communication method, comprising:
   detecting that a traffic density in a communication band used by the first wireless communication method exceeds a predetermined traffic density; and
   limiting the traffic density in the communication band of the first wireless communication method by a wireless terminal when the traffic density is detected to exceed the predetermined traffic density,
   wherein the limitation step,
      denies an association request using the first wireless communication method from the wireless terminal when the traffic density is detected to exceed the predetermined traffic density,
      includes sending an error message to the wireless terminal by using the first communication method when the association request is denied, and
      includes receiving an association request corresponding to the error message from the wireless terminal by using the second wireless communication method, and associating with the wireless terminal by the second wireless communication method.

11. A method according to claim 10, wherein the wireless relay uses a second wireless communication method using a communication band different from the communication band of the first wireless communication method.

12. A method according to claim 10, wherein the limitation step includes
   selecting a wireless terminal to be disassociated from a plurality of associated wireless terminals when the traffic density is detected to exceed the predetermined traffic density, and
   releasing wireless connection with the selected wireless terminal.

13. A method according to claim 12, wherein the selection step includes
   measuring field intensities of radio waves transmitted by the plurality of associated wireless terminals, and
   selecting a wireless terminal which transmits radio waves at the lowest field intensity among the measured field intensities.

14. A method according to claim 12, wherein the selection step includes
   measuring communication times with the plurality of associated wireless terminals, and
   selecting a wireless terminal having the shortest communication time among the measured communication times.

15. A method according to claim 12, wherein the selection step includes selecting a wireless terminal having the lowest priority by referring to storage means which stores priority levels of the plurality of associated wireless terminals.

* * * * *